United States Patent
Dussarat et al.

(10) Patent No.: US 7,729,440 B2
(45) Date of Patent: Jun. 1, 2010

(54) FREQUENCY MODULATOR FOR DIGITAL TRANSMISSIONS

(75) Inventors: Gérard Dussarat, Saint Sebastien sur Loire (FR); Daniel Bourasseau, Nantes (FR)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 10/503,389

(22) PCT Filed: Feb. 14, 2003

(86) PCT No.: PCT/FR03/00487

§ 371 (c)(1),
(2), (4) Date: Aug. 3, 2004

(87) PCT Pub. No.: WO03/071757

PCT Pub. Date: Aug. 28, 2003

(65) Prior Publication Data

US 2005/0111578 A1      May 26, 2005

(30) Foreign Application Priority Data

Feb. 22, 2002  (FR) .................. 02 02304

(51) Int. Cl.
*H04L 27/00* (2006.01)
*H04L 27/12* (2006.01)
*H03C 3/00* (2006.01)

(52) U.S. Cl. .................. 375/295; 375/305; 332/117

(58) Field of Classification Search .......... 375/271–273, 375/295, 305, 303, 274, 286; 332/117, 110, 332/100; 327/126–128, 114
See application file for complete search history.

(56) References Cited

U.S. PATENT DOCUMENTS

| | | | | |
|---|---|---|---|---|
| 4,426,710 A | * | 1/1984 | Pommier | 375/291 |
| 4,465,970 A | * | 8/1984 | DiMassimo et al. | 324/116 |
| 5,216,391 A | * | 6/1993 | Shiraishi et al. | 332/101 |
| 5,454,009 A | * | 9/1995 | Fruit et al. | 375/130 |
| 5,467,373 A | * | 11/1995 | Ketterling | 375/327 |
| 5,524,087 A | * | 6/1996 | Kawamura et al. | 708/276 |
| 5,757,239 A | * | 5/1998 | Gilmore | 331/18 |
| 5,812,604 A | | 9/1998 | Fruit et al. | |
| 5,884,220 A | | 3/1999 | Farmer et al. | |

(Continued)

FOREIGN PATENT DOCUMENTS

EP      0822421      2/1998

OTHER PUBLICATIONS

International Search Report—PCT/FR03/00487, International Search Authority—European Patent Office, Jun. 24, 2003.

(Continued)

*Primary Examiner*—Tesfaldet Bocure
(74) *Attorney, Agent, or Firm*—Jeffrey D. Jacobs

(57) ABSTRACT

The invention relates to a method of transmitting digital data exhibiting a rate T by means of a frequency modulator able to modulate as a function of the data, a central carrier frequency f0 at a first frequency value $f0+\frac{1}{4}T$ and/or a second frequency value $f0-\frac{1}{4}T$. It comprises the step consisting in modulating the carrier frequency from one of the frequency values to the other during a time interval T, via successive frequency stages.

19 Claims, 5 Drawing Sheets

U.S. PATENT DOCUMENTS 5,942,955 A * 8/1999 Matui .......................... 332/101
6,308,311 B1 * 10/2001 Carmichael et al. ........... 716/16
7,123,665 B2 * 10/2006 Brown et al. ................. 375/303
7,123,666 B2 * 10/2006 Brown et al. ................. 375/303

OTHER PUBLICATIONS

International Preliminary Examination Report—PCT/FR03/00487, IPEA—EP, Apr. 8, 2004.

* cited by examiner

FREQUENCY MODULATOR FOR DIGITAL TRANSMISSIONS

CROSS-REFERENCE TO RELATED APPLICATIONS

The present Application is based on International Application No. PCT/FR03/00487, filed on February 14, 2003, entitled "FREQUENCY MODULATOR FOR DIGITAL TRANSMISSIONS", which in turn corresponds to FR 02/02304 filed on Feb. 22, 2002, and priority is hereby claimed under 35 USC §119 based on these applications. Each of these applications are hereby incorporated by reference in their entirety into this application.

FIELD OF THE INVENTION

The invention relates to a method of transmitting digital data by means of a frequency modulator based on a frequency modulation of minimum phase gradient or "Minimum Shift Keying" (MSK) type.

The subject of the invention is also the corresponding device.

The invention applies to all digital data transmissions using MSK-type frequency modulation.

It applies in particular to the accurate determination of the position of a mobile on the basis of necessary data transmitted between a reference station and the mobile, both receiving satellite-based positioning signals.

For the determination of the absolute position of a mobile, use is commonly made of satellite-based position measurement means, using for example the radio signals emitted by the satellites of the GPS (Global Positioning System) or of other similar systems (GLONASS system, future GALILEO system). The accuracy obtained goes from a few meters to a few tens of meters.

BACKGROUND OF THE INVENTION

In the GPS system, the signal emitted by a satellite is coded and the time taken by the signal to reach the point to be located is used to determine the distance between this satellite and this point, preferably called the pseudo-distance so as to take account of synchronization errors between the clock of the satellite and that of the station. These synchronization errors are conventionally eliminated by calculation when the signals are received from at least four different satellites. The determination of the distance between the point to be located and several satellites makes it possible, knowing the geographical coordinates of the satellites, to calculate the coordinates of the point to be located, usually coordinates expressed as latitude, longitude and altitude in a fixed terrestrial reference frame.

To determine the precise position of a mobile (accuracy of from a centimeter to a meter, as the case may be), a so-called "differential GPS" procedure is used, which consists in using, at the level of the mobile, for the calculation of its position, the errors noted with regard to each pseudo-distance at the level of a so-called reference station of known position.

This procedure makes it possible to correct the position calculation errors due in particular to trajectory deformations and to propagation. These errors are corrected, for example, by comparing for the reference station its known position and its calculated position arising from the measurement of the propagation time between the satellite and the reference station.

SUMMARY OF THE INVENTION

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

The digital data corresponding to these errors are transmitted by the reference station to the mobile. Traditionally, these digital data are transmitted by radio using MSK-type frequency modulation, well-suited to an information bit rate that may be as much as 200 baud (bits per second).

For greater information bit rates, such as 400 baud, the MSK-type frequency modulation is no longer suitable since it exhibits too wide a frequency spectrum that decreases too slowly.

It is in fact recalled that the narrower the spectra of the reference stations and the faster they decrease, the more they can be juxtaposed on the same frequency band without them encroaching on one another and thus the more reference stations there can be.

Now, it is noted that curve a), representing in FIG. 1 the frequency spectrum of an MSK modulation at 400 baud, exhibits at 1000 Hz a sidelobe situated at around −38 dB from the central lobe, whereas one wants it to be situated at around −50 dB.

One solution consists in preceding the MSK frequency modulation by a Gaussian low-pass filtering. One is then dealing with a Gaussian minimum phase gradient, or "GMSK" (Gaussian minimum shift keying) modulation, whose frequency spectrum is represented by curve b) of FIG. 1. The spectral occupancy is better adapted than in the case of "MSK" modulation, but the GMSK modulation introduces undesirable inter-symbol crosstalk.

It is recalled that inter-symbol crosstalk consists in the reception of the data (also termed symbols) being scrambled through the simultaneous reception of the correct data and of a tailoff of the previous data item or even of the previous but one.

An important aim of the invention is therefore to propose a method and a device exhibiting spectral occupancy equivalent to that exhibited by GMSK modulation, without introducing inter-symbol crosstalk.

Another aim of the invention is to propose a method that is easy to implement.

To achieve these aims, the invention proposes a method of transmitting digital data exhibiting a rate T by means of a frequency modulator able to modulate as a function of the data, a central carrier frequency $f0$ at a first frequency value $f0+\frac{1}{4}T$ and/or a second frequency value $f0-\frac{1}{4}T$, this process being characterized in that it comprises the step consisting in modulating the central carrier frequency $f0$ from one of the frequency values to the other during a time interval T, via successive frequency stages.

Thus, instead of going directly from a first frequency value corresponding to a first value of a data item, to a second frequency value corresponding to a second value of a data item, one goes from the first frequency to the second through successive frequency stages.

The frequency spectrum corresponding to these staged changes of frequency exhibits a faster decrease than the spectrum of an "MSK" modulation.

This staged change of frequency furthermore exhibits the advantage of consuming less energy at high frequency than during instantaneous changes of frequency such as in the case of "MSK" modulation, this energy gain then being in part carried over to the central lobe of the spectrum, thus giving it a slightly wider useful band than in the case of "MSK" modulation and resulting in a gain in the signal/noise ratio with respect to "MSK", for identical conditions.

According to a characteristic of the invention, the frequency stages for going from f0−¼T to f0+¼T are the same in absolute value as the frequency stages for going from f0+¼T to f0−¼T.

The number of frequency stages for going from one of the frequency values to the other is preferably equal to 16.

The method applies in particular when the digital data are transmitted between a reference station and a mobile of a satellite-based positioning system.

Also, the subject of the invention is not only the method of transmitting data, the gist of which has just be described, but also a device able to implement a frequency modulation at a rate T according to two predetermined frequencies. This device comprises means for shaping the said modulation as several frequency stages during a time interval T.

This device comprises a microprocessor able to program the frequency stages and preferably, linked to the microprocessor, a device able to shape the modulation as a function of data to be transmitted and of the programmed stages.

Finally, a subject of the invention is a frequency modulator, characterized in that it comprises a device able to shape a frequency modulation as described and a device for generating instantaneous frequencies.

BRIEF DESCRIPTION OF THE DRAWINGS

Other characteristics and advantages of the invention will become apparent on reading the detailed description which follows and which is given with reference to the appended drawings in which.

the curves represented diagrammatically in FIG. 1 illustrate the variation of the frequency spectrum of a modulator of "MSK" type (curve a) and "GMSK" type (curve b).

The frequency modulation according to the invention is based on an "MSK"-type modulation.

DESCRIPTION OF THE PREFERRED EMBODIMENT

Figure 2A:
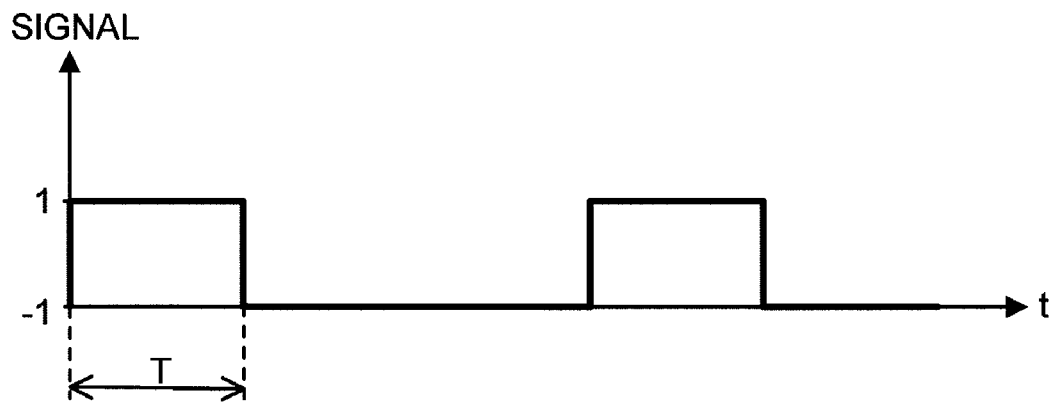
FIGS. 2a), 2b) and 2c) diagrammatically represent, as a function of time t, respectively an example of binary data to be transmitted, and the corresponding frequency and phase modulations.

The features of the frequency modulation of "MSK" type are briefly recalled on the basis of an example described in conjunction with FIGS. 2a), 2b) and 2c).

This is of course a constant-amplitude modulation.

Figure 2B:
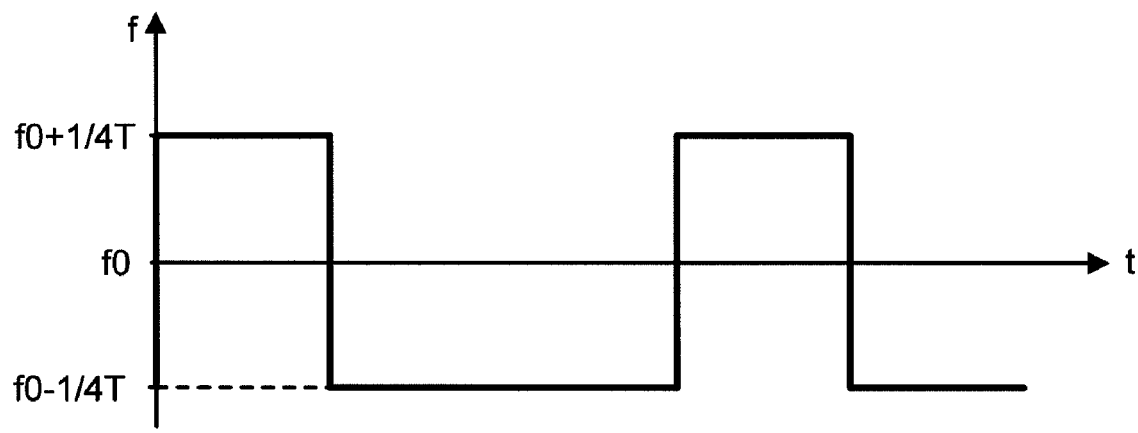

The binary data to be transmitted, represented in FIG. 2a), each have a duration T also referred to as the data rate. As represented in FIG. 2b), each data item is transmitted as a frequency, for a duration T according to the following characteristics:

a) +1 is represented by the first frequency f0+¼T, b) −1 is represented by the second frequency f0−¼T, f0 being the central carrier frequency.

With this frequency modulation may be associated over the duration T, a variation of the phase according to the following formula:

$$\varphi = \int_0^T 2\pi f(t) dt \quad (1)$$

Figure 2C:
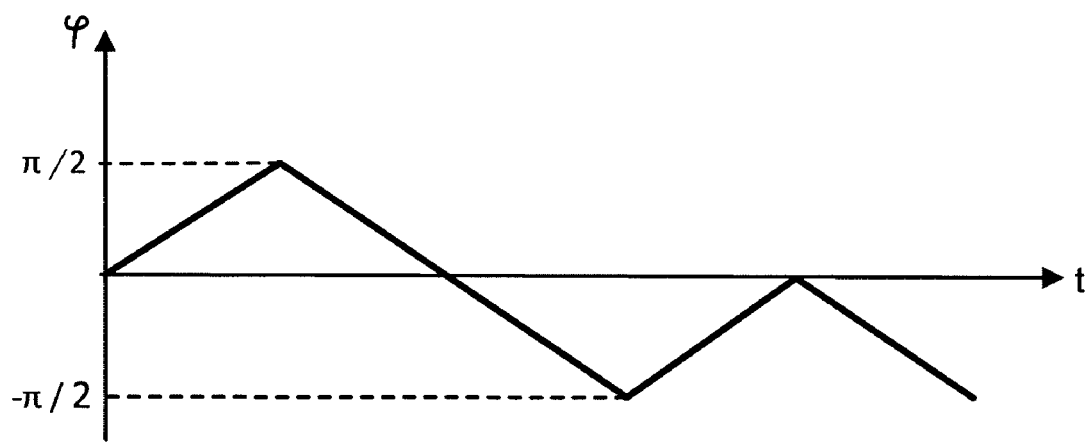

The deviation ¼T is chosen in such a way that the corresponding phase φ, represented in FIG. 2c), varies linearly between −π/2 and π/2.

On reception, phase demodulation is often preferred to frequency demodulation.

The method according to the invention consists in going from one frequency to the other according to successive stages in such a way as to attain the desired frequency (f0±¼T) at the end of the duration T. Thus, at the end of a time T, the corresponding phase φ attains the same value (±π/2) as in the case of "MSK" modulation; this makes it possible on reception to phase-demodulate the data received whether they have been modulated according to conventional "MSK" modulation or according to the invention.

In what follows, consideration is given to an example of frequency modulation with 16 frequency stages, the carrier frequency f0 taking values between 1.6 and 3.5 MHz, in particular 1.8146 MHz, the rate T corresponding to 400 Hz and ¼T being equal to 100 Hz. The data thus modulated in this HF (high frequency) range are transmitted by means of a suitable antenna, in this instance a large antenna.

The number of stages may take other values such as, for example, 8 or 32.

Figure 1:
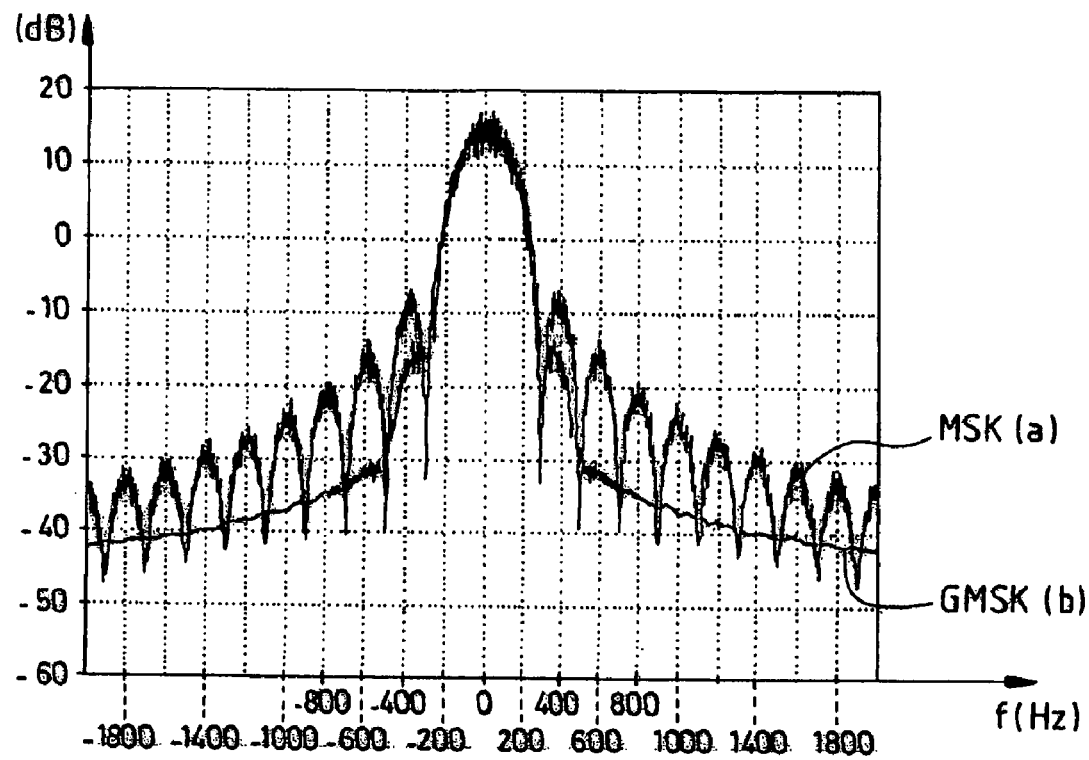
Figure 3:
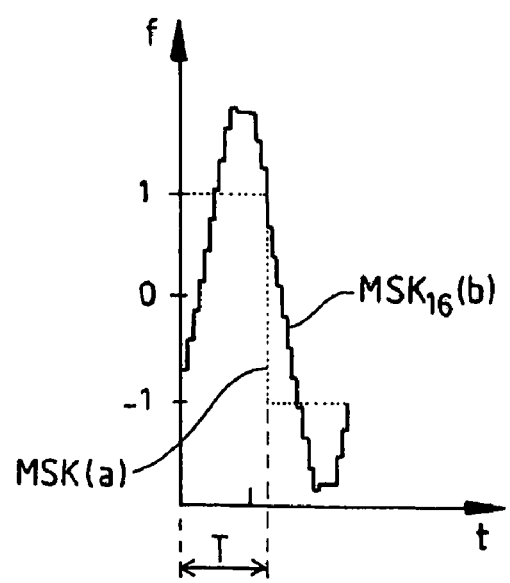
FIG. 3 diagrammatically represents as a function of time t, the frequency modulations corresponding to an input signal comprising the data −1, 1, −1 for a conventional "MSK" modulation (curve a) and for an exemplary modulation according to the invention designated "MSK16" (curve b)

Illustrated in FIG. 3 is this example of frequency modulation for an input signal comprising the data −1, 1, −1. Curve a) corresponds to conventional "MSK" modulation and exhibits two frequency states; curve b) corresponds to the modulation according to the invention referred to as "MSK16" since the modulation is shaped as 16 frequency stages.

As regards the "MSK16" curve (b), the frequency f0+¼T normalized in the figure to +1 is attained at the 16th stage; likewise, the frequency f0−¼T normalized in the figure to −1 is attained at the 16th stage. In order for a receiver able to demodulate data modulated according to an "MSK" modulation to be compatible with a modulation according to the invention, "MSK16" for example, it is necessary for the phase to be equal to ±π/2 at the end of the time T. This is why, having regard to relation (1), certain frequency stages exceed (in absolute value) the frequency to be attained.

The "MSK16" curve (b) which, in order to go from the frequency −1 to the frequency +1 with a phase variation equal to ±π/2, exhibits 16 frequency stages of the form $k_i \times (\frac{1}{4}T)$, i varying from 1 to 16, was obtained with the following coefficients $k_i$:

| −0.703 | −0.413 | −0.12  | +0.173 |
|--------|--------|--------|--------|
| +0.466 | +0.76  | +1.053 | +1.346 |
| +1.64  | +1.933 | +2.226 | +2.053 |
| +1.791 | +1.528 | +1.266 | +1     |

Likewise, the 16 frequency stages for going from +1 to −1 were obtained with the opposite coefficients:

| +0.703 | +0.413 | +0.12  | −0.173 |
|--------|--------|--------|--------|
| −0.466 | −0.76  | −1.053 | −1.346 |
| −1.64  | −1.933 | −2.226 | −2.053 |
| −1.791 | −1.528 | −1.266 | −1     |

Figure 4:
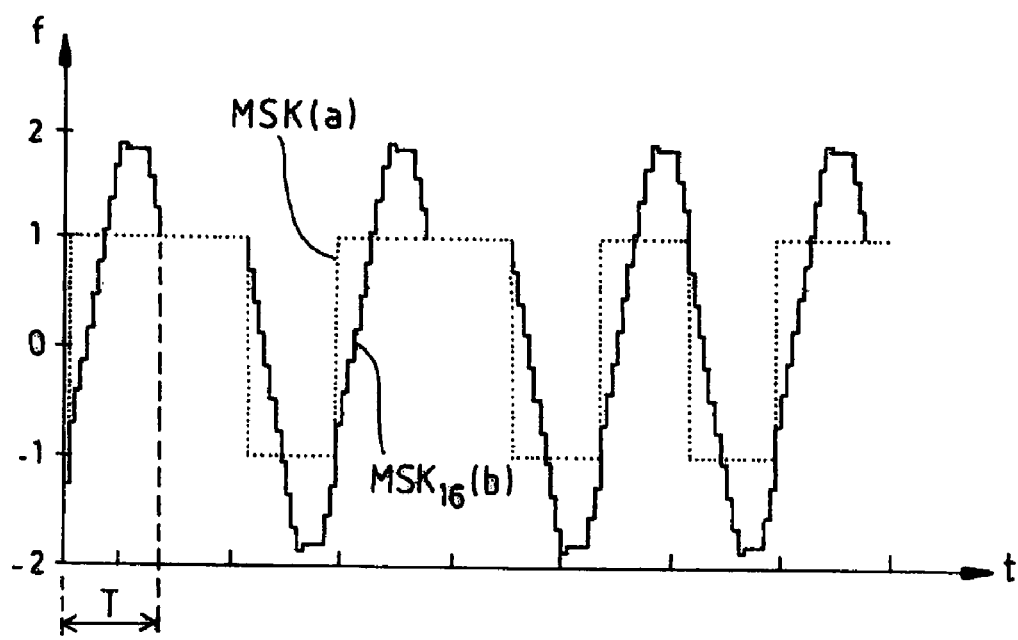
FIG. 4 diagrammatically represents as a function of time t, the "MSK" modulation (curve a) and "MSK16" modulation (curve b) for an input signal comprising the data −1, 1, 1, −1, 1, 1, −1, 1, −1, 1.

Of course, as in the case of "MSK", the frequency remains stable when the data do not change; illustrated in FIG. 4 are the "MSK" modulation (curve a) and "MSK16" modulation (curve b) for an input signal comprising the data −1, 1, 1, −1, 1, 1, −1, 1, −1, 1. The differences between these two curves appear only at the changes of frequency.

Figure 5:
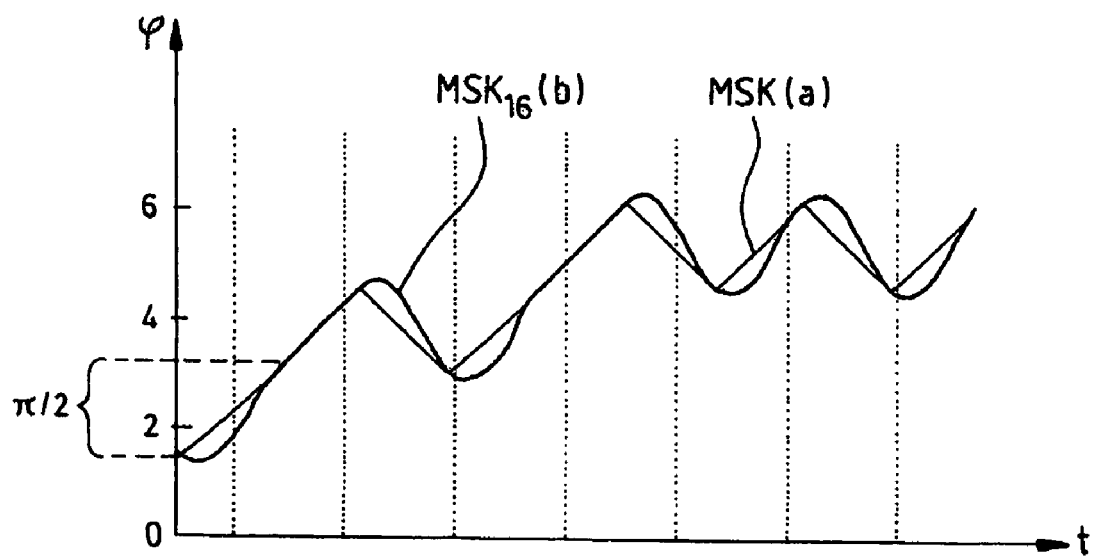
FIG. 5 diagrammatically represents as a function of time, the phase variations corresponding to the said "MSK" modulation (curve a) and "MSK16" modulation (curve b) for an input signal comprising the data −1, 1, 1, −1, 1, 1, −1, 1, −1, 1.

The phase variations of this input signal are illustrated in FIG. 5: curves a and b corresponding respectively to the "MSK" and "MSK16" modulations. The phases vary by ±π/2 over T in both cases, the phase of curve b) first lagging slightly behind that of curve a) and subsequently catching it up.

Figure 6:
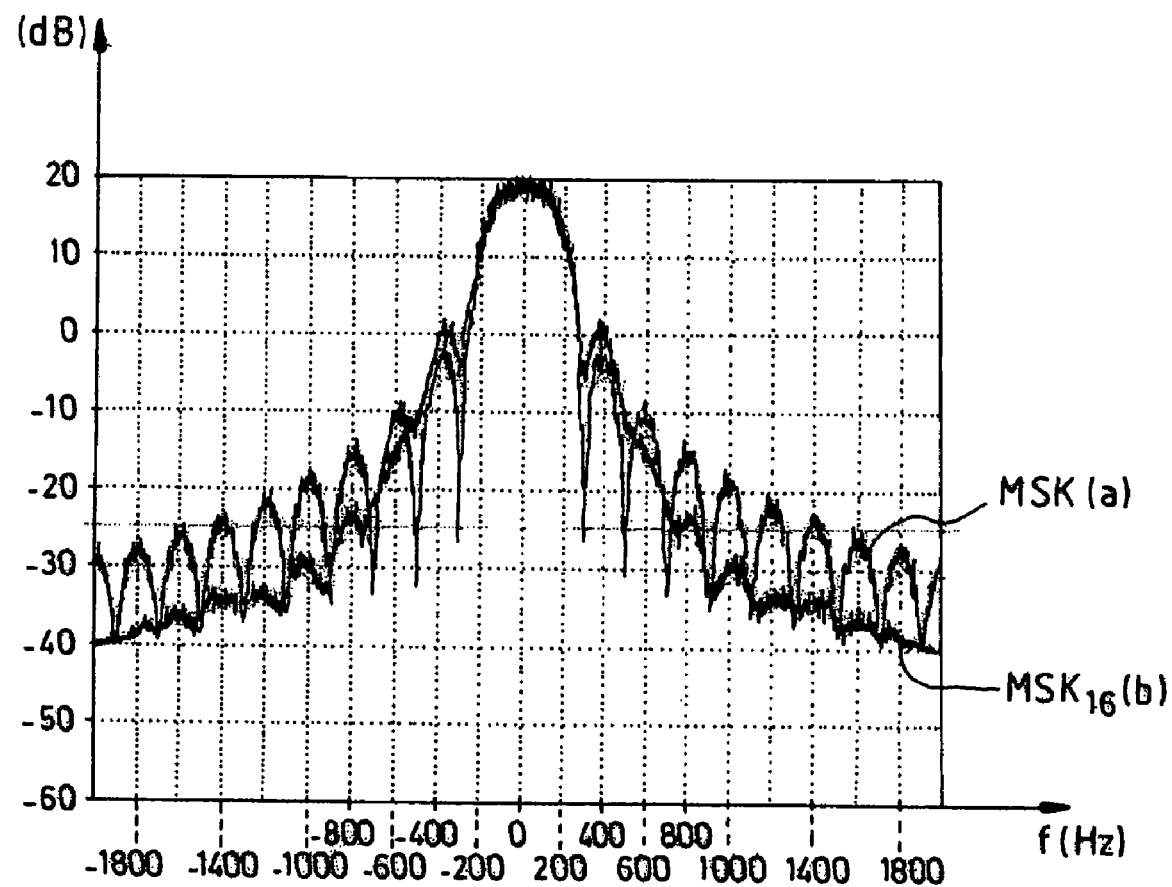
FIG. 6 diagrammatically represents the frequency spectra of an "MSK" modulation at 400 baud (curve a) and of an "MSK16" modulation at 400 baud (curve b)

The frequency spectrum of an "MSK16" modulation at 400 baud exhibits, as illustrated in FIG. 6, curve b a faster decrease than the spectrum of an "MSK" modulation at 400 baud also, illustrated by curve a. At 1000 Hz, one clearly obtains a sidelobe situated at around −50 dB of the central lobe and the sidelobes are much less marked.

This staged change of frequency furthermore exhibits the advantage of consuming less energy at high frequency than during instantaneous changes of frequency, as in the case of "MSK" modulation, this energy gain then being in part carried over to the central lobe of the spectrum which is flatter in the case of "MSK16" modulation than in that of "MSK" modulation and thus gives it a slightly wider useful band and therefore a signal/noise ratio higher by around 2 dB, for identical conditions.

As has been seen, as far as reception is concerned, conventional phase or frequency demodulation corresponding to "MSK" modulation may be performed.

Figure 7:
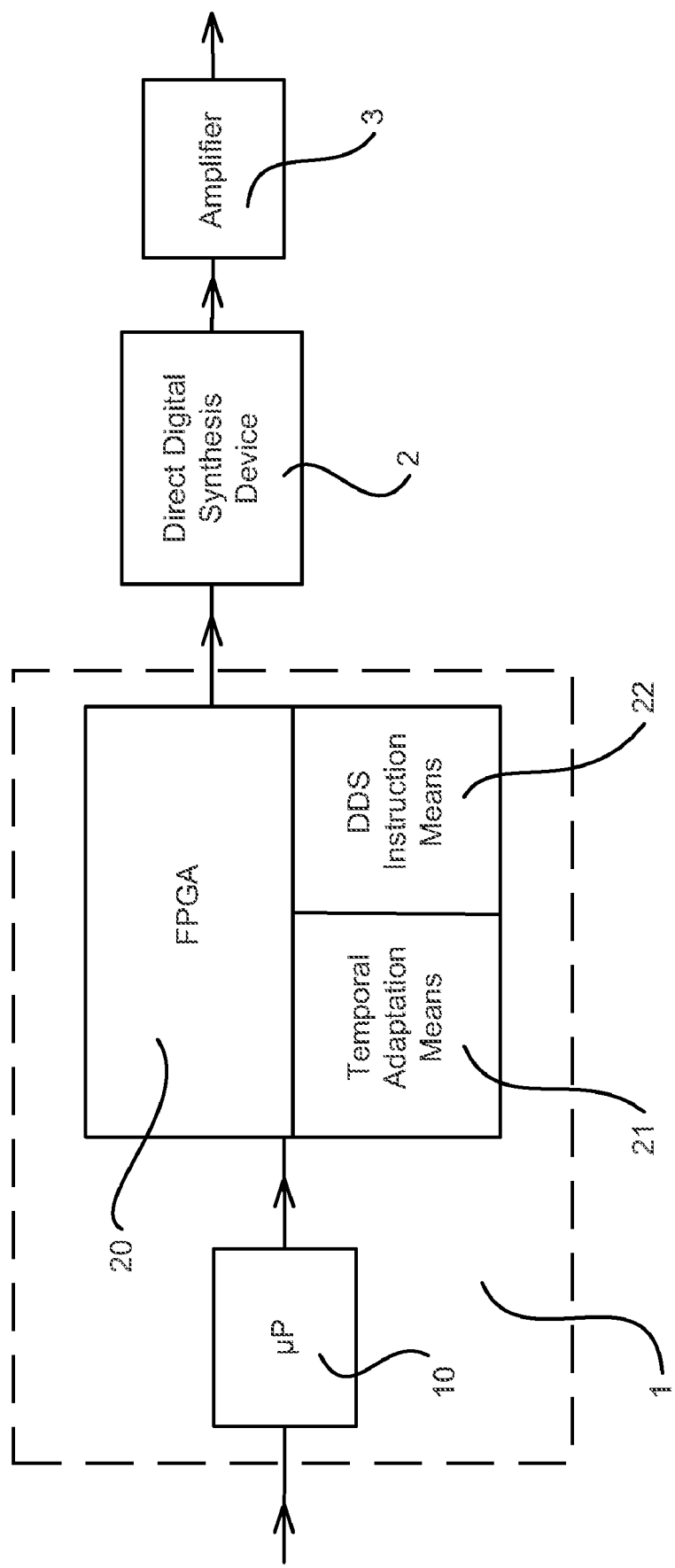
FIG. 7 diagrammatically represents an exemplary device able to implement the method according to the invention.

As represented in FIG. 7, the method according to the invention is implemented by a modulator comprising a device 1 for shaping the modulation as 16 stages, which is linked to a device 2 able to generate the instantaneous frequency using, for example, a "DDS" function, the acronym standing for "Direct Digital Synthesis", this device itself being linked to a power amplifier 3. When the carrier frequency lies in a frequency range other than the HF range, a frequency transposition circuit may possibly be added between the device 2 and the amplifier 3.

The device 1 for shaping the modulation as 16 frequency stages comprises means 10 for programming the 16 stages, included for example in a microprocessor, these means 10 being linked to means 20 for shaping the modulation as a function of the data to be transmitted and of the frequency stages such as programmed.

These means 20 for shaping the modulation may be included in the microprocessor.

These means 20 for shaping the modulation preferably comprise an "FPGA", the acronym standing for "Field Programmable Gate Array", linked to the microprocessor. The "FPGA" comprises, on the one hand and traditionally, means 21 for temporally adapting the data to be transmitted and, on the other hand, means 22 for providing the "DDS" type device with the instructions for generating the frequencies corresponding to the data modulated according to an "MSK16" modulation.

Such a modulator which makes it possible to obtain a frequency spectrum exhibiting the same advantages as that obtained by a "GMSK"-type modulator, is however of simpler design insofar as it does not use any Gaussian filter.

Moreover, by eliminating the Gaussian filter, it eliminates the corresponding part of the analog processing (filtering) of the data, thereby simplifying overall the management and the reliability of the modulator.

Furthermore, it exhibits no inter-symbol crosstalk.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of transmitting digital data, the data comprising a series of data items each having either a first value or a second value and exhibiting a rate T, using a frequency modulator to modulate as a function of the data, a central carrier frequency f0 at a first frequency value f0+¼T representing one of the first value and the second value and/or a second frequency value f0−¼T representing the other of the first value and the second value, the method comprising:
    modulating, using the frequency modulator, the central carrier frequency f0 from one of the first and second frequency values representing the value of one of the data items in the series to the other of the first and second frequency values representing the value of the next data item in the series during a time interval T; and
    wherein the modulating is performed via successive frequency stages in each of which successive frequency stages the frequency is modulated to have a different respective frequency value, and at the end of the time interval T the frequency attains the other of the first and second frequency values.

2. The method as claimed in claim 1, wherein the number of frequency stages for going from f0−¼T to f0+¼T is the same as for going from f0+¼T to f0−¼T.

3. The method as claimed in claim 2, wherein the frequency stages for going from f0−¼T to f0+¼T are the same in absolute value as the frequency stages for going from f0+¼T to f0−¼T.

4. The method as claimed in claim 3, wherein the number of frequency stages for going from one of the frequency values to the other is 16.

5. The method as claimed in claim 3, wherein the digital data are transmitted between a reference station and a mobile, the reference station and the mobile each configured to receive satellite-based positioning signals.

6. The method as claimed in claim 2, wherein the digital data are transmitted between a reference station and a mobile, the reference station and the mobile each configured to receive satellite-based positioning signals.

7. The method as claimed in claim 1, wherein the number of frequency stages for going from one of the frequency values to the other is 16.

8. The method as claimed in claim 7, wherein the digital data are transmitted between a reference station and a mobile, the reference station and the mobile each configured to receive satellite-based positioning signals.

9. The method as claimed in claim 1, wherein the digital data are transmitted between a reference station and a mobile, the reference station and the mobile each configured to receive satellite-based positioning signals.

10. The method as claimed in claim 2, wherein the number of frequency stages for going from one of the frequency values to the other is 16.

11. A frequency modulator to transmit digital data comprising a series of data items each having either a first value or a second value, the frequency modulator to implement a frequency modulation at a rate T according to a first predetermined frequency representing the first value and a second predetermined frequency representing the second value, the modulator comprising a microprocessor configured to:
    modulate a central carrier frequency from one of the first and second frequencies to the other of the first and second frequencies during a time interval T to provide a modulation output signal; and
    wherein the modulating is to be performed via successive frequency stages in each of which successive frequency stages the frequency is modulated to have a different respective frequency, and at the end of the time interval T the frequency attains the other of the first and second frequencies.

12. The modulator as claimed in claim 11, wherein the microprocessor is further configured to program the frequency stages.

13. The modulator as claimed in claim 12, further comprising a field programmable gate array, linked to the microprocessor, to shape the modulation as a function of data to be transmitted and of the programmed stages.

14. The modulator as claimed in claim 11, further comprising a direct digital synthesis device to generate instantaneous frequencies corresponding to the modulation.

15. A method of transmitting digital data, the data comprising a series of data items each having either a first value or a second value and exhibiting a rate T, using a frequency modulator to modulate as a function of the data, a central carrier frequency $f0$ at a first frequency value $f0+\frac{1}{4}T$ representing one of the first value and the second value and/or a second frequency value $f0-\frac{1}{4}T$ representing the other of the first value and the second value, the method comprising:
    modulating, using the frequency modulator, the central carrier frequency $f0$ from one of the first and second frequency values representing the value of one of the data items in the series to the other of the first and second frequency values representing the value of the next data item in the series during a time interval T; and
    wherein the modulating is performed via successive frequency stages in each of which successive frequency stages the frequency is modulated to have a different respective frequency value, and at the end of the time interval T the frequency attains the other of the first and second frequency values, and wherein the number of frequency stages is 16.

16. A method of transmitting digital data, the data comprising a series of data items each having either a first value or a second value and exhibiting a rate T, using a frequency modulator to modulate as a function of the data, a central carrier frequency $f0$ at a first frequency value $f0+\frac{1}{4}T$ representing one of the first value and the second value and/or a second frequency value $f0-\frac{1}{4}T$ representing the other of the first value and the second value, the method comprising:
    modulating, using the frequency modulator, the central carrier frequency $f0$ from one of the first and second frequency values representing the value of one of the data items in the series to the other of the first and second frequency values representing the value of the next data item in the series during a time interval T; and
    wherein the modulating is performed via successive frequency stages in each of which successive frequency stages the frequency is modulated to have a different respective frequency value, and at the end of the time interval T the frequency attains the other of the first and second frequency values, and wherein the number of frequency stages is 8 or 32.

17. A frequency modulator to implement a frequency modulation at a rate T according to two predetermined frequencies each representing either a first value of a data item or a second value of a data item, the modulator comprising:
    a microprocessor configured to shape the modulation as several frequency stages each having a different respective frequency value, during a time interval T, wherein the microprocessor is further configured to program the frequency stages; and
    a programmable device, linked to the microprocessor, to shape the modulation as a function of data to be transmitted and of the programmed stages.

18. The frequency modulator of claim 17, wherein the programmable device is a field programmable gate array.

19. The frequency modulator of claim 17, wherein the frequency modulator is to modulate a central carrier frequency $f0$ at a first frequency value $f0+\frac{1}{4}T$ representing the first value and a second frequency value $f0-\frac{1}{4}T$ representing the second value.

* * * * *